US011991698B2

(12) United States Patent
Zhao

(10) Patent No.: US 11,991,698 B2
(45) Date of Patent: May 21, 2024

(54) CONTROL INFORMATION SENDING METHOD, RECEIVING METHOD AND APPARATUS, AND STORAGE MEDIUM

(71) Applicant: KONINKLIJKE PHILIPS N.V.

(72) Inventor: Qun Zhao, Beijing (CN)

(73) Assignee: Koninklijke Philips N.V., Eindhoven (NL)

( * ) Notice: Subject to any disclaimer, the term of this patent is extended or adjusted under 35 U.S.C. 154(b) by 436 days.

(21) Appl. No.: 17/292,000

(22) PCT Filed: Nov. 8, 2018

(86) PCT No.: PCT/CN2018/114624
§ 371 (c)(1),
(2) Date: May 6, 2021

(87) PCT Pub. No.: WO2020/093324
PCT Pub. Date: May 14, 2020

(65) Prior Publication Data
US 2021/0298002 A1   Sep. 23, 2021

(51) Int. Cl.
H04W 72/20 (2023.01)
H04L 1/00 (2006.01)
H04W 72/0453 (2023.01)

(52) U.S. Cl.
CPC .......... H04W 72/20 (2023.01); H04L 1/0038 (2013.01); H04W 72/0453 (2013.01)

(58) Field of Classification Search
CPC ............. H04W 72/04; H04W 72/0406; H04W 72/044; H04W 72/0453; H04W 5/0058;
(Continued)

(56) References Cited

U.S. PATENT DOCUMENTS

2014/0328329 A1* 11/2014 Novlan ............. H04W 56/0015
370/336
2015/0271846 A1* 9/2015 Kowalski .............. H04W 72/23
370/329
(Continued)

FOREIGN PATENT DOCUMENTS

CN 107612666 A 1/2018
CN 107734548 A 2/2018
(Continued)

OTHER PUBLICATIONS

International Search Report in Application No. PCT/CN2018/114624, dated Jul. 10, 2019.
(Continued)

Primary Examiner — Warner Wong

(57) ABSTRACT

A control information sending method and a control information receiving method include: a transmitter determining a first frequency-domain bandwidth occupied by user data to be sent; the transmitter selecting, according to the first frequency-domain bandwidth, from n candidate frequency-domain bandwidths, a second frequency-domain bandwidth occupied by control information corresponding to the user data, wherein n is an integer greater than 1; the transmitter sending the control information to a receiver according to the second frequency-domain bandwidth; the receiver determining that the transmitter sends the n candidate frequency-domain bandwidths of the control information; and the receiver performing blind detection on the control information according to the n candidate frequency-domain bandwidths.

15 Claims, 5 Drawing Sheets

(58) Field of Classification Search
CPC ............ H04W 5/0064; H04W 72/0457; H04L 1/0036; H04L 1/0038; H04L 12/40065; H04L 2012/5631; H04L 2012/5632; H04L 2012/6456; H04L 5/0053; H04L 47/70; H04L 47/76; H04L 47/781
See application file for complete search history.

(56) References Cited

U.S. PATENT DOCUMENTS

| | | | |
|---|---|---|---|
| 2015/0327315 A1 | 11/2015 | Xue et al. | |
| 2016/0295624 A1* | 10/2016 | Novlan | H04L 67/12 |
| 2018/0131468 A1* | 5/2018 | Blasco Serrano | H04L 1/0061 |
| 2019/0090250 A1* | 3/2019 | Lee | H04W 72/02 |
| 2020/0029245 A1* | 1/2020 | Khoryaev | H04W 36/22 |

FOREIGN PATENT DOCUMENTS

| | | | | |
|---|---|---|---|---|
| CN | 108028740 A | | 5/2018 | |
| WO | 2018018628 A1 | | 1/2018 | |
| WO | WO-2021159538 A1 * | | 8/2021 | ............ H04W 72/04 |

OTHER PUBLICATIONS

Written Opinion of International Search Authority in Application No. PCT/CN2018/114624, dated Jul. 5, 2019.

\* cited by examiner

CONTROL INFORMATION SENDING METHOD, RECEIVING METHOD AND APPARATUS, AND STORAGE MEDIUM

CROSS-REFERENCE TO RELATED APPLICATION

This application is a U.S. national stage of International Patent Application No. PCT/CN2018/114624 filed on Nov. 8, 2018, the disclosure of which is hereby incorporated by reference in its entirety.

TECHNICAL FIELD

The embodiments of the present disclosure relate to the field of communication technologies, and in particular to a method and device for sending control information and for receiving control information and a storage medium in a sidelink communication scenario.

BACKGROUND

In Vehicle to Everything (V2X) technology, in-vehicle devices can communicate with other devices (such as other in-vehicle devices, roadside infrastructure, or the like) through a sidelink. For a sidelink communication scenario in the V2X technology, it is necessary to provide a higher communication rate, a shorter communication delay, and a more reliable communication quality to meet more service requirements.

With respect to the sidelink communication scenario in the V2X technology, how a transmitter sends control information and user data to a receiver is a problem to be studied and resolved. Before sending the user data to the receiver, the transmitter needs to send necessary information required for reception of the user data to the receiver through the control information. The receiver generally detects and correctly receives the control information by using blind detection, and then correctly receives and demodulates the user data according to content contained in the control information. If a Time Division Multiplexing (TMD) method is used to transmit the control information and corresponding user data, the processing delay and buffer consumption of the receiver can be reduced.

In related arts, it is proposed that frequency-domain resources occupied by transmission of the control information are the same as the frequency-domain resources occupied by the transmission of the user data. That is, a frequency-domain bandwidth occupied by the control information is the same as the frequency-domain bandwidth occupied by the corresponding user data, and a frequency-domain position occupied by the control information is also the same as the frequency-domain position occupied by the corresponding user data.

Since the frequency-domain resources occupied by the user data are dynamically determined according to a size of the user data, selected modulation and coding methods, etc., if the same frequency-domain resources are used for the control information and the user data, the receiver needs to perform blind detection on all possible frequency-domain positions that may be occupied by the control information, which leads to a very high complexity of the blind detection on the control information by the receiver.

SUMMARY

The embodiments of the present disclosure provide a method and device for sending control information and for receiving control information and a storage medium in a sidelink communication scenario. The technical solutions are as follows.

According to a first aspect of the embodiments of the present disclosure, there is provided a method for sending control information in a sidelink communication scenario, and the method includes:
  determining, by a transmitter, a first frequency-domain bandwidth occupied by user data to be sent;
  selecting, by the transmitter according to the first frequency-domain bandwidth, from a number of n candidate frequency-domain bandwidths, a second frequency-domain bandwidth occupied by control information corresponding to the user data, where n is an integer greater than 1; and
  sending, by the transmitter according to the second frequency-domain bandwidth, the control information to a receiver.

Optionally, the second frequency-domain bandwidth is a candidate frequency-domain bandwidth closest to the first frequency-domain bandwidth among the n candidate frequency-domain bandwidths.

Optionally, the second frequency-domain bandwidth is a candidate frequency-domain bandwidth that is not greater than the first frequency-domain bandwidth among the n candidate frequency-domain bandwidths.

Optionally, the second frequency-domain bandwidth is a candidate frequency-domain bandwidth closest to the first frequency-domain bandwidth among the candidate frequency-domain bandwidths that are not greater than the first frequency-domain bandwidth.

Optionally, the sending, by the transmitter according to the second frequency-domain bandwidth, the control information to the receiver includes:
  determining, by the transmitter according to a first frequency-domain position occupied by the user data and the second frequency-domain bandwidth, a second frequency-domain position occupied by the control information, wherein the second frequency-domain position overlaps with the first frequency-domain position; and
  sending, by the transmitter by occupying frequency-domain resources at the second frequency-domain position, the control information to the receiver.

Optionally, the control information includes indication information configured to indicate the first frequency-domain bandwidth occupied by the user data.

According to a second aspect of the embodiments of the present disclosure, there is provided a method for receiving control information in a sidelink communication scenario, and the method includes:
  determining, by a receiver, a number of n candidate frequency-domain bandwidths for a transmitter to send control information, wherein a second frequency-domain bandwidth occupied by the control information in sending of the control information is one of the n candidate frequency-domain bandwidths, and n is an integer greater than 1; and
  performing, by the receiver according to the n candidate frequency-domain bandwidths, blind detection on the control information.

Optionally, the method further includes:
  determining, by the receiver according to the detected control information, a first frequency-domain bandwidth occupied by user data corresponding to the control information in sending of the user data, wherein the control information includes indication information configured to indicate the first frequency-domain bandwidth occupied by the user data; and receiving, by the receiver, the user data in the first frequency-domain bandwidth.

According to a third aspect of the embodiments of the present disclosure, there is a device for sending control information in a sidelink communication scenario, which is applied to a transmitter, and the device includes:

a determining module, configured to determine a first frequency-domain bandwidth occupied by user data to be sent;

a selecting module configured to select, according to the first frequency-domain bandwidth, from a number of n candidate frequency-domain bandwidths, a second frequency-domain bandwidth occupied by control information corresponding to the user data, where n is an integer greater than 1; and a sending module configured to send the control information to a receiver according to the second frequency-domain bandwidth.

Optionally, the second frequency-domain bandwidth is a candidate frequency-domain bandwidth closest to the first frequency-domain bandwidth among the n candidate frequency-domain bandwidths.

Optionally, the second frequency-domain bandwidth is a candidate frequency-domain bandwidth that is not greater than the first frequency-domain bandwidth among the n candidate frequency-domain bandwidths.

Optionally, the second frequency-domain bandwidth is a candidate frequency-domain bandwidth closest to the first frequency-domain bandwidth among the candidate frequency-domain bandwidths that are not greater than the first frequency-domain bandwidth.

Optionally, the sending module is configured to:

determine, according to a first frequency-domain position occupied by the user data and the second frequency-domain bandwidth, a second frequency-domain position occupied by the control information, wherein the second frequency-domain position overlaps with the first frequency-domain position; and send the control information to the receiver by occupying frequency-domain resources at the second frequency-domain position.

Optionally, the control information includes indication information configured to indicate the first frequency-domain bandwidth occupied by the user data.

According to a fourth aspect of the embodiments of the present disclosure, a device for receiving control information in a sidelink communication scenario is provided, which is applied to a receiver, and the device includes:

a first determining module configured to determine a number of n candidate frequency-domain bandwidths for a transmitter to send control information, wherein a second frequency-domain bandwidth occupied by the control information in sending of the control information is one of the n candidate frequency-domain bandwidths, and n is an integer greater than 1; and a detection module configured to perform blind detection on the control information according to the n candidate frequency-domain bandwidths.

Optionally, the device further includes:

a second determining module configured to determine, according to the detected control information, a first frequency-domain bandwidth occupied by user data corresponding to the control information in sending of the user data, wherein the control information includes indication information configured to indicate the first frequency-domain bandwidth occupied by the user data; and a receiving module configured to receive the user data in the first frequency-domain bandwidth.

According to a fifth aspect of the embodiments of the present disclosure, a device for sending control information in a sidelink communication scenario is provided, which is applied to a transmitter, and the device includes:

a processor; and a memory for storing instructions executable by the processor, wherein the processor is configured to:

determine a first frequency-domain bandwidth occupied by user data to be sent;

select, according to the first frequency-domain bandwidth, from a number of n candidate frequency-domain bandwidths, a second frequency-domain bandwidth occupied by control information corresponding to the user data, where n is an integer greater than 1; and send the control information to a receiver according to the second frequency-domain bandwidth.

According to a sixth aspect of the embodiments of the present disclosure, a device for receiving control information in a sidelink communication scenario is provided, which is applied to a receiver, and the device includes:

a processor; and a memory for storing instructions executable by the processor, wherein the processor is configured to:

determine a number of n candidate frequency-domain bandwidths for a transmitter to send control information, wherein a second frequency-domain bandwidth occupied by the control information in sending of the control information is one of the n candidate frequency-domain bandwidths, and n is an integer greater than 1; and perform blind detection on the control information according to the n candidate frequency-domain bandwidths.

According to a seventh aspect of the embodiments of the present disclosure, there is provided a non-transitory computer-readable storage medium having stored thereon a computer program which, when being executed by a processor, implements the steps of the method according to the first aspect, or implements the steps of the method according to the second aspect.

The technical solutions provided by the embodiments of the present disclosure can include the following beneficial effects.

The transmitter selects one candidate frequency-domain bandwidth from among a plurality of candidate frequency-domain bandwidths according to the first frequency-domain bandwidth occupied by the user data, as the second frequency-domain bandwidth occupied by the control information, and then sends the control information to the receiver according to the second frequency-domain bandwidth. Since the second frequency-domain bandwidth occupied by the control information is selected from a pre-set limited number of candidate frequency-domain bandwidths, the frequency-domain positions that may be occupied by the control information are also relatively limited, thereby reducing the complexity of the blind detection on the control information by the receiver.

It should be understood that the above general description and the following detailed description are only exemplary and explanatory, and should not limit the disclosure.

BRIEF DESCRIPTION OF THE DRAWINGS

The drawings herein are incorporated in and constitute a part of the specification, illustrate embodiments consistent with the present disclosure, and together with the description serve to explain the principles of the present disclosure.

DETAILED DESCRIPTION

Exemplary embodiments will be described in detail here, examples of which are illustrated in the accompanying drawings. When the following description refers to the accompanying drawings, the same numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure as detailed in the appended claims.

The network architecture and service scenarios described in the embodiments of the present disclosure are intended to more clearly illustrate the technical solutions of the embodiments of the present disclosure, and do not constitute a limitation on the technical solutions provided by the embodiments of the present disclosure. Those of ordinary skill in the art will understand that with evolution of the network architecture and emergence of new service scenarios, the technical solutions provided in the embodiments of the present disclosure are equally applicable to similar technical problems.

Figure 1:
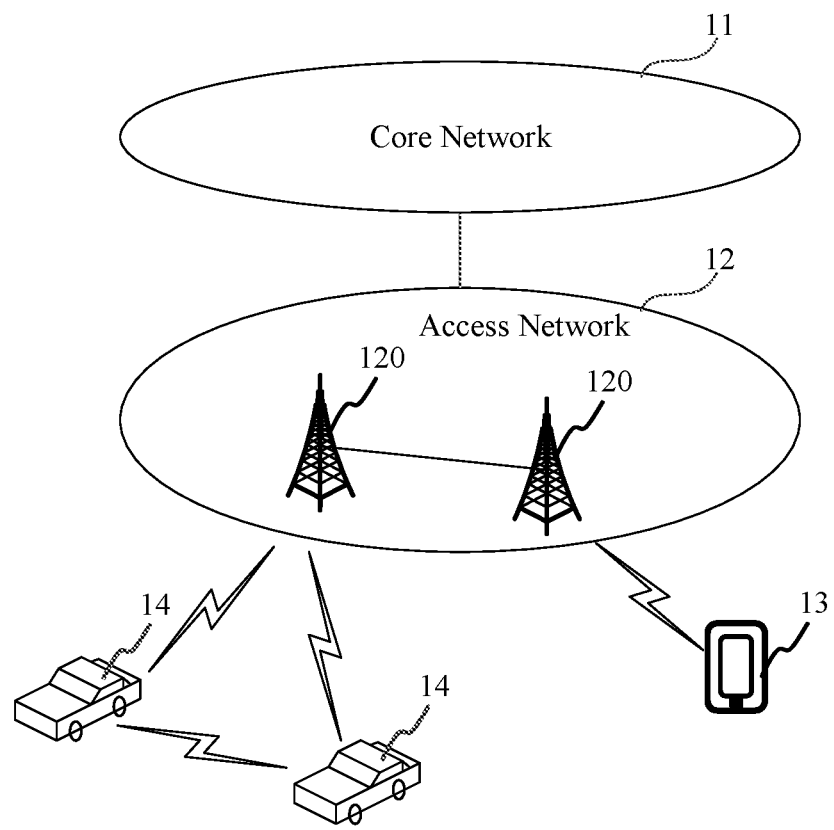
FIG. 1 is a schematic diagram illustrating a network architecture to which an embodiment of the present disclosure may be applied.

FIG. 1 is a schematic diagram illustrating a network architecture to which an embodiment of the present disclosure may be applied. The network architecture may be a network architecture of a C-V2X system, where C refers to Cellular, and the C-V2X system is a wireless communication system for vehicles evolved based on a cellular network communication system for 3G, 4G, 5G, or the like. The network architecture may include a core network 11, an access network 12, a terminal 13, and vehicles 14.

The core network 11 includes several core network devices. The functions of the core network devices are mainly to provide user connections, to manage users, and to implement bearing of services, and serve as a bearer network to provide an interface to an external network. For example, the core network of a Long-Term Evolution (LTE) system may include devices such as a Mobility Management Entity (MME), a Serving Gateway (S-GW), and a PDN Gateway (P-GW), among others. The core network of a 5G NR system may include devices such as an Access and Mobility Management Function (AMF) entity, a User Plane Function (UPF) entity, a Session Management Function (SMF) entity, among others.

The access network 12 includes several access network devices 120. The access network devices 120 and the core network devices communicate with each other through a certain radio interface technology, such as a S1 interface in the LTE system and a NG interface in the 5G NR system. The access network device 120 may be a base station (BS), which is a device deployed in an access network to provide a wireless communication function for a terminal. The base station may include various forms of macro base stations, micro base stations, relay stations, access points, and so on. In systems using different wireless access technologies, the names of devices having base station functions may be different. For example, in the LTE system, they are called eNodeB or eNB, and in the 5G NR system, they are called gNodeB or gNB. The name of "base station" may change as communication technology evolves. For ease of description, in the embodiments of the present disclosure, the above-mentioned devices that provide wireless communication functions for terminals are collectively referred to as access network devices.

The terminal 13 may include various handheld devices, in-vehicle devices, wearable devices, computing devices or other processing devices connected to wireless modems that have the wireless communication function, as well as various forms of User Equipment (UE), Mobile Stations (MSs), terminal devices, etc. For ease of description, the devices mentioned above are collectively referred to as terminals. The access network devices 120 and the terminal 13 communicate with each other through a certain radio interface technology, such as a Uu interface.

The vehicle 14 may be an autonomous vehicle or a non-autonomous vehicle. The vehicle 14 is equipped with an in-vehicle device, and realizes communication with other vehicles, the terminal 13 or other devices, such as a Road Side Unit (RSU), through the in-vehicle device. The in-vehicle device may also be called an in-vehicle terminal, an in-vehicle communication device, or others, which are not limited in the embodiments of the present disclosure. The in-vehicle device can be a device integrated in a Telematics BOX (T-BOX), or can be a device separate from the vehicle body. In addition, the in-vehicle device may be installed in the vehicle 14 before the vehicle 14 leaves the factory, or may be installed in the vehicle 14 after the vehicle 14 leaves the factory.

The in-vehicle device of the vehicle 14 and other devices (such as other in-vehicle devices, the terminal 13, the RSU, etc.) can communicate with each other through a sidelink communication interface (such as a PC5 interface). Accordingly, the communication link established based on the sidelink communication interface can be called a sidelink. In addition, communication between the in-vehicle device of the vehicle 14 and other devices can also be transferred through the access network 12 and the core network 11, that is, the communication is performed by using the communication link between the terminal 13 and the access network device 120 in the original cellular network. Compared with the communication based on the Uu interface, the communication based on the sidelink communication interface has the characteristics of short delay and low overhead, and is suitable for communication between the in-vehicle device and other peripheral devices that are in proximity in the geographical position.

The above network architecture shown in FIG. 1 can implement V2X service scenarios. The above network architecture may also include devices such as a RSU, a V2X application server, and a V2X control functional node, which are not limited in the embodiments of the present disclosure. In addition, the technical solutions described in the embodiments of the present disclosure can be applicable to the LTE system, and can also be applicable to future evolution systems of the LTE system, such as an LTE-Advanced (LTE-A) system or a 5G NR system.

In an embodiment of the present disclosure, a method for sending control information is provided for a sidelink communication scenario in the above V2X service scenario, so as to reduce the complexity of the blind detection on the control information by the receiver.

In an embodiment of the present disclosure, the transmitter and the receiver are two end devices that perform the sidelink communication in the V2X service scenario, can establish a sidelink through a sidelink communication interface (such as a PC5 interface), and then perform interaction of the user data and the control information through the sidelink. For example, the transmitter may be an in-vehicle device of the vehicle 14 in the network architecture shown in FIG. 1, and the receiver may be an in-vehicle device of another vehicle, the terminal 13 or an RSU. For another example, the transmitter may be the terminal 13 in the network architecture shown in FIG. 1, and the receiver may be another terminal, or may also be the in-vehicle device of the vehicle 14 or the RSU. In some embodiments, the same device (such as the same in-vehicle device or the same terminal) can be used as the transmitter in some scenarios, and can also be used as the receiver in some other scenarios.

Before sending the user data to the receiver, the transmitter needs to send necessary information required for reception of the user data to the receiver through the control information. The receiver generally uses blind detection to detect and correctly receive the control information, and then correctly receives and demodulates the user data according to content contained in the control information. In an embodiment of the present disclosure, the control information corresponding to the user data refers to control information that carries necessary information required for reception of the user data. For example, the control information may include information such as positions of time-frequency resource blocks occupied by the user data, and modulation and coding methods of the user data, among others.

Hereinafter, the technical solution of the present disclosure will be explained through several exemplary embodiments.

Figure 2:
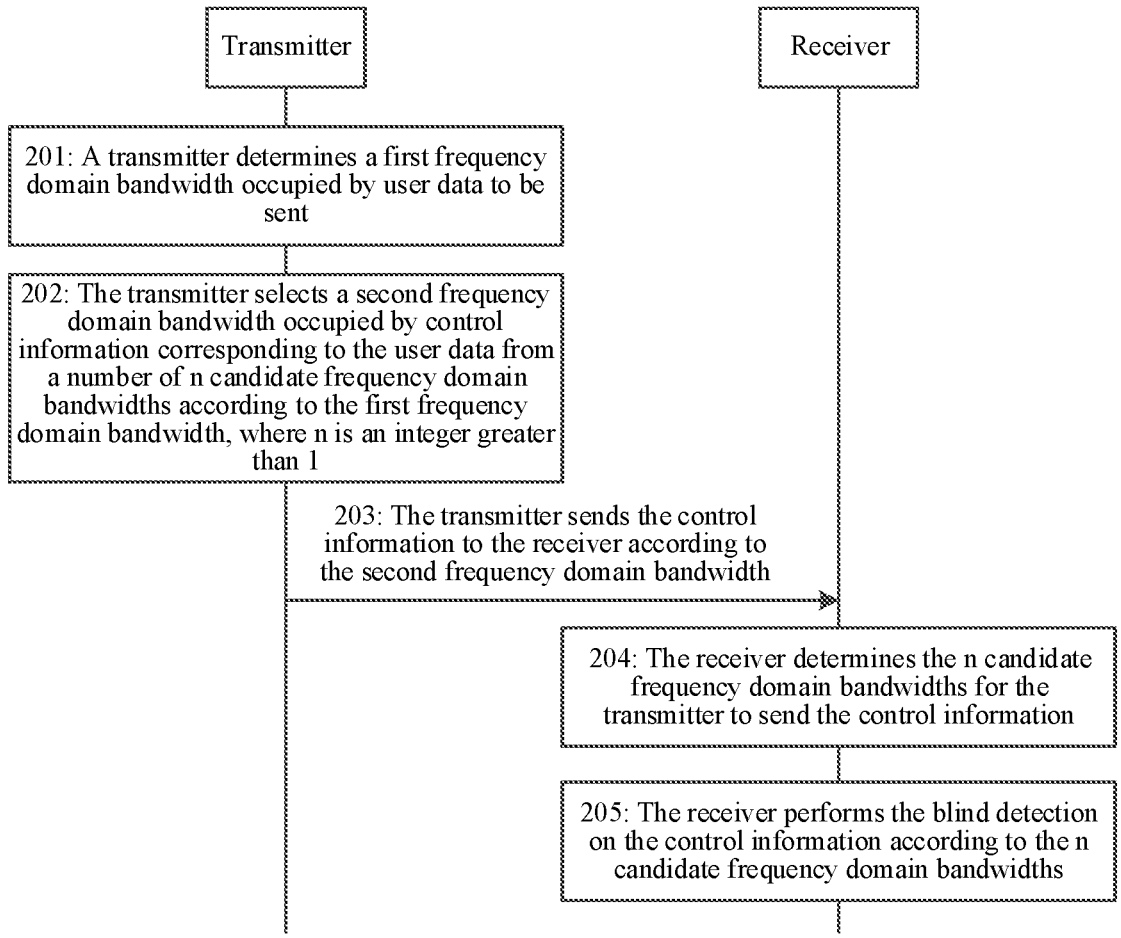
FIG. 2 is a flow chart showing a method for sending control information in a sidelink communication scenario according to an exemplary embodiment.

FIG. 2 is a flow chart showing a method for sending control information in a sidelink communication scenario according to an exemplary embodiment. This method can be applied to the network architecture shown in FIG. 1. The method can include the following steps (201 to 205).

In step 201, a transmitter determines a first frequency-domain bandwidth occupied by user data to be sent.

The user data to be sent represents user data that needs to be sent to a receiver but has not yet been sent. Optionally, the transmitter determines the first frequency-domain bandwidth that needs to be occupied by the user data according to a data amount and a modulation and coding mode of the user data to be sent.

In step 202, the transmitter selects a second frequency-domain bandwidth occupied by control information corresponding to the user data from a number of n candidate frequency-domain bandwidths according to the first frequency-domain bandwidth, where n is an integer greater than 1.

The above n candidate frequency-domain bandwidths refer to a limited number of frequency-domain bandwidths that are preset for selection by the transmitter before sending the control information. In an embodiment of the present disclosure, the number of the above candidate frequency-domain bandwidths and a specific value of each of the candidate frequency-domain bandwidths are not restricted, and can be pre-defined by the protocol, pre-configured by the transmitter, or configured for the transmitter by the access network device through downlink signaling.

Figure 3:
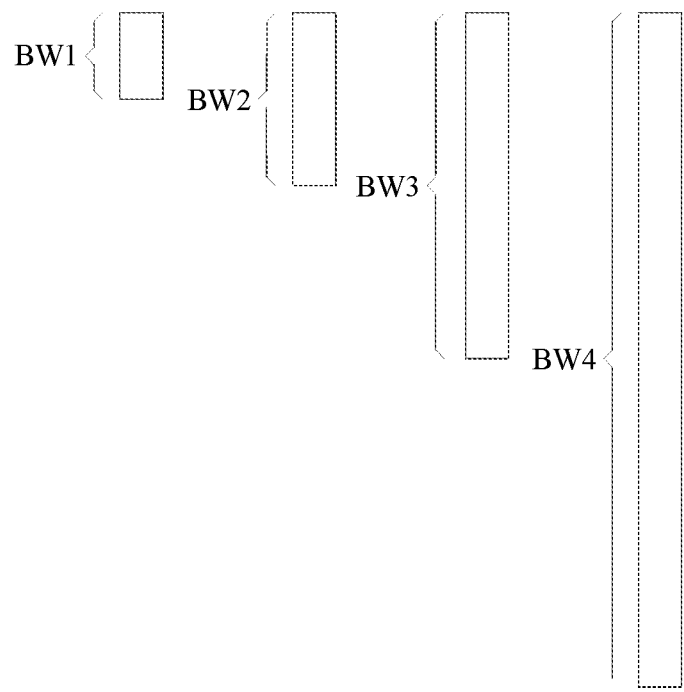
FIG. 3 exemplarily shows a schematic diagram of several candidate frequency-domain bandwidths.

Illustratively, as shown in FIG. 3, it is assumed that there are four candidate frequency-domain bandwidths for the control information, which are BW1, BW2, BW3, and BW4, respectively, and BW1<BW2<BW3<BW4. The transmitter can select a candidate frequency-domain bandwidth from the above four candidate frequency-domain bandwidths according to the first frequency-domain bandwidth occupied by the user data to be sent, as the second frequency-domain bandwidth occupied by the control information corresponding to the user data.

Optionally, the above n candidate frequency-domain bandwidths are arranged in an ascending order, and the n candidate frequency-domain bandwidths may be in a geometric sequence or an arithmetic sequence. For example, assuming that there are four candidate frequency-domain bandwidths for the control information, and a smallest candidate frequency-domain bandwidth is a, when the four candidate frequency-domain bandwidths are in the geometric sequence, the four candidate frequency-domain bandwidths arranged in the ascending order can be a, $2a$, $4a$ and $8a$ in sequence; or when the four candidate frequency-domain bandwidths are in the arithmetic sequence, the four candidate frequency-domain bandwidths arranged in the ascending order can be a, $2a$, $3a$ and $4a$. The above n candidate frequency-domain bandwidths can also be arranged in a descending order, and the arrangement of the candidate frequency-domain bandwidths is not limited in the embodiment.

The method in which the transmitter selects the second frequency-domain bandwidth occupied by the control information corresponding to the user data from the n candidate frequency-domain bandwidths includes but is not limited to the following two methods.

In a possible implementation, the second frequency-domain bandwidth is a candidate frequency-domain bandwidth closest to the first frequency-domain bandwidth among the n candidate frequency-domain bandwidths. That is, the transmitter selects the candidate frequency-domain bandwidth that is closest to the first frequency-domain bandwidth from the above n candidate frequency-domain bandwidths, as the second frequency-domain bandwidth occupied by the control information.

For example, the first frequency-domain bandwidth occupied by the user data to be sent is BW0. Assuming that among the above four candidate frequency-domain bandwidths, the candidate frequency-domain bandwidth closest to BW0 is BW2, the transmitter selects BW2 as the second frequency-domain bandwidth occupied by the control information. The above "closest" means that a difference with the first frequency-domain bandwidth is the smallest.

Optionally, if there are two candidate frequency-domain bandwidths that are closest to the first frequency-domain bandwidth, the transmitter may select any candidate frequency-domain bandwidth from the two candidate frequency-domain bandwidths, as the second frequency-domain bandwidth occupied by the control information, or may select a smaller candidate frequency-domain bandwidth from the two candidate frequency-domain bandwidths, as the second frequency-domain bandwidth occupied by the control information. For example, the first frequency-domain bandwidth occupied by the user data to be sent is BW0, it is assumed that among the above four candidate frequency-domain bandwidths, the candidate frequency-domain bandwidths closest to BW0 are BW2 and BW3, that is, the difference between BW0 and BW2 is equal to the difference between BW3 and BW0, then the transmitter can select any one of BW2 and BW3 as the second frequency-domain bandwidth occupied by the control information, or select a smaller candidate frequency-domain bandwidth (i.e., BW2) as the second frequency-domain bandwidth occupied by the control information.

By selecting the candidate frequency-domain bandwidth closest to the first frequency-domain bandwidth occupied by the user data as the second frequency-domain bandwidth occupied by the control information, if the transmitter needs to keep the transmission power for the control information and the user data unchanged, it can reduce the power density inconsistency for the control information and the user data per unit bandwidth as much as possible; and if the transmitter needs to maintain the same power density for the control information and the user data per unit bandwidth, the transmission power difference between the control information and the user data can be reduced.

In another possible implementation, the second frequency-domain bandwidth is a candidate frequency-domain bandwidth that is not greater than the first frequency-domain bandwidth among the n candidate frequency-domain bandwidths. That is, the transmitter selects the candidate frequency-domain bandwidth that is not greater than the first frequency-domain bandwidth from the above n candidate frequency-domain bandwidths, as the second frequency-domain bandwidth occupied by the control information.

For example, the first frequency-domain bandwidth occupied by the user data to be sent is BW0, assuming BW1<BW2<BW0<BW3<BW4, the transmitter may select BW1 or BW2 as the second frequency-domain bandwidth occupied by the control information.

Optionally, the second frequency-domain bandwidth is the candidate frequency-domain bandwidth that is closest to the first frequency-domain bandwidth among the candidate frequency-domain bandwidths that are not greater than the first frequency-domain bandwidth. That is, if there are a plurality of candidate frequency-domain bandwidths that are not greater than the first frequency-domain bandwidth among the above n candidate frequency-domain bandwidths, the transmitter selects, from the plurality of candidate frequency-domain bandwidths that are not greater than the first frequency-domain bandwidth, a largest candidate frequency-domain bandwidth as the second frequency-domain bandwidth occupied by the control information. Still in the above example, the first frequency-domain bandwidth occupied by the user data to be sent is BW0, assuming that BW1<BW2<BW0<BW3<BW4, then the transmitter selects BW2 as the second frequency-domain bandwidth occupied by the control information.

By selecting a candidate frequency-domain bandwidth that is not greater than the first frequency-domain bandwidth occupied by user data as the second frequency-domain bandwidth occupied by control information, when the transmission powers for the control information and the user data are the same, it can be ensured that the power density for the control information per unit bandwidth will not be less than the power density for the user data per unit bandwidth, so as to ensure that a transmission distance of the control information will not be less than the transmission distance of the user data, and to ensure that the receiver successfully receives the control information as much as possible.

In addition, if there are a plurality of different types of control information between the transmitter and the control device, a plurality of candidate frequency-domain bandwidths that are set correspondingly to each type of the control information may be the same or different, which is not limited in the embodiment of the present disclosure. For example, various different types of control information are divided according to the number of bits of the control information, the number of bits of the same type of control information is the same, each type of control information is correspondingly set with a plurality of candidate frequency-domain bandwidths, and the plurality of candidate frequency-domain bandwidths that are set correspondingly to any two types of control information can be the same or different.

In step 203, the transmitter sends the control information to the receiver according to the second frequency-domain bandwidth.

After selecting the second frequency-domain bandwidth occupied by the control information, the transmitter sends the control information to the receiver in accordance with the second frequency-domain bandwidth. For example, the transmitter determines frequency-domain resources occupied by the second frequency-domain bandwidth according to the second frequency-domain bandwidth, and then occupies the frequency-domain resources to send the control information to the receiver.

In an example, it is assumed that the system bandwidth for the sidelink communication between the transmitter and the receiver is 48 Physical Resource Blocks (PRBs), and there are 4 candidate frequency-domain bandwidths, which are BW1=2 PRBs, BW2=4 PRBs, BW3=8 PRBs and BW4=16 PRBs, respectively. When the candidate frequency-domain bandwidth is BW1, every 2 adjacent PRBs form a group, and the entire system bandwidth is divided into 24 groups of PRBs; when the candidate frequency-domain bandwidth is BW2, every 4 adjacent PRBs form a group, and the entire system bandwidth is divided into 12 groups of PRBs; when the candidate frequency-domain bandwidth is BW3, every 8 adjacent PRBs form a group, and the entire system bandwidth is divided into 6 groups of PRBs; and when the candidate frequency-domain bandwidth is BW4, every 16 adjacent PRBs form a group, and the entire system bandwidth is divided into 3 groups of PRBs. If the transmitter determines to select the candidate frequency-domain bandwidth BW2 as the second frequency-domain bandwidth occupied by the control information, the transmitter may select one group of PRBs from the above 12 groups of PRBs for transmission of the control information.

Optionally, the above step 203 includes the following sub-steps (2031 to 2032).

At 2031, the transmitter determines a second frequency-domain position occupied by the control information according to a first frequency-domain position occupied by the user data as well as the second frequency-domain bandwidth, wherein the second frequency-domain position overlaps with the first frequency-domain position.

The transmitter can use the TDM method to send the control information and the user data to the receiver. The control information and the user data occupy different time domain resources, and the control information and the user data occupy the same or similar frequency-domain resources. That is, the second frequency-domain position occupied by the control information overlaps with the first frequency-domain position occupied by the user data.

Figure 4:
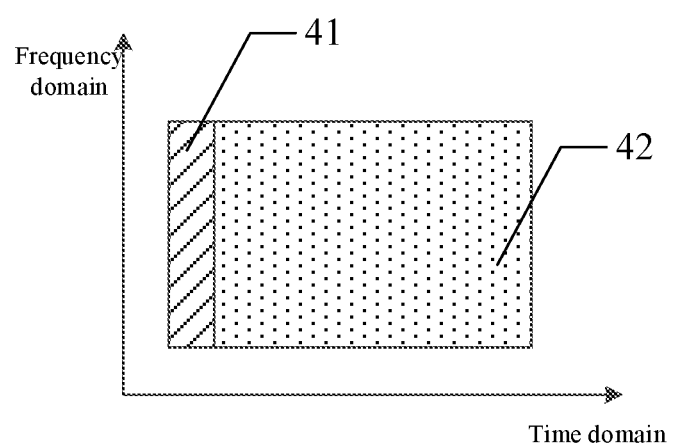
FIG. 4 exemplarily shows a schematic diagram of time-frequency resources occupied by control information and user data.

For example, when the second frequency-domain bandwidth occupied by the control information is the same as the first frequency-domain bandwidth occupied by the user data, the same frequency-domain resources can be occupied for transmission of the control information and of the user data, that is, the second frequency-domain position occupied by the control information is the same as (i.e., completely overlaps with) the first frequency-domain position occupied by the user data. With reference to FIG. 4, the time-frequency resources occupied by the control information are indicated by reference numeral 41, and the time-frequency resources occupied by the user data is indicated by reference numeral 42.

Figure 5:
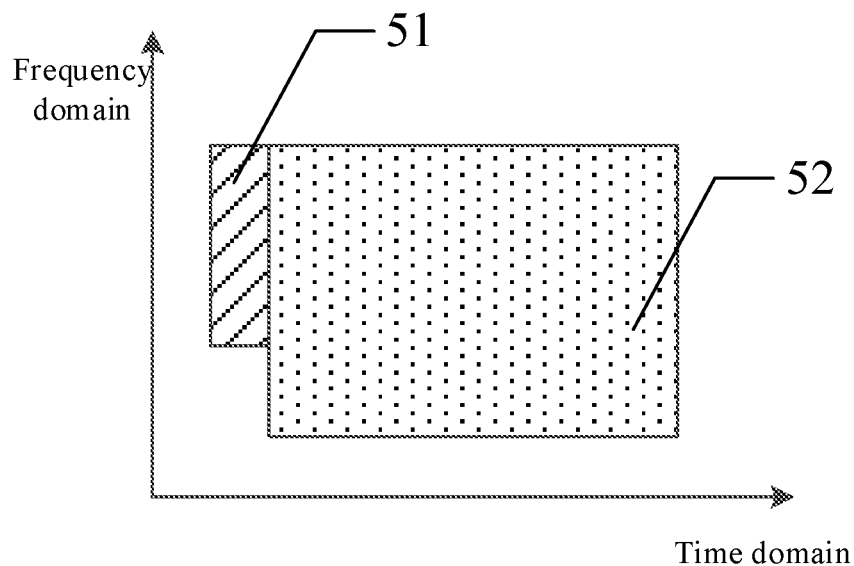
FIG. 5 exemplarily shows another schematic diagram of time-frequency resources occupied by control information and user data.

For another example, when the second frequency-domain bandwidth occupied by the control information is different from the first frequency-domain bandwidth occupied by the user data, similar frequency-domain resources can be occupied for transmission of the control information and of the user data, that is, the second frequency-domain position occupied by the control information partially overlaps with the first frequency-domain position occupied by the user data. With reference to FIG. 5, the time-frequency resources occupied by the control information are indicated by reference numeral 51, and the time-frequency resources occupied by the user data is indicated by reference numeral 52.

At 2032, the transmitter occupies the frequency-domain resources at the second frequency-domain position to send the control information to the receiver.

After determining the second frequency-domain position occupied by the control information, the transmitter occupies the frequency-domain resources at the second frequency-domain position to send the control information to the receiver.

In an example, it is assumed that the system bandwidth for the sidelink communication between the transmitter and the receiver is 48 PRBs, and that the frequency-domain bandwidth occupied by the user data is 16 PRBs. For example, the first to sixteenth PRBs are occupied for transmission of the user data. If the transmitter determines that the second frequency-domain bandwidth occupied by the control information is also 16 PRBs, the transmitter may occupy the first to sixteenth PRBs to send the control information. If the transmitter determines that the second frequency-domain bandwidth occupied by the control information is 8 PRBs, the transmitter may occupy the first to eighth PRBs to send the control information.

In addition, the control information carries necessary information required for reception of the user data, such as positions of the time-frequency resource blocks occupied by the user data, a modulation and coding mode of the user data, among others. Optionally, the control information includes indication information configured to indicate the first frequency-domain bandwidth occupied by the user data. When the second frequency-domain bandwidth occupied by the control information is selected in the method provided in the foregoing step 202, fewer information bits can be used to represent the indication information. In an example, it is assumed that the system bandwidth for the sidelink communication between the transmitter and the receiver is 48 PRBs, and if the first frequency-domain bandwidth occupied by the user data is independent of the second frequency-domain bandwidth occupied by control information, the first frequency-domain bandwidth occupied by the user data may be 1 PRB, 2 PRBs, 3 PRBs, . . . , or 48 PRBs, that is, there are 48 possibilities for the first frequency-domain bandwidth occupied by the user data, which requires at least 6 bits to represent the above indication information. If the first frequency-domain bandwidth occupied by the user data is associated with the second frequency-domain bandwidth occupied by the control information, that is, the second frequency-domain bandwidth occupied by the control information is determined according to the first frequency-domain bandwidth occupied by the user data, for example, when BW2 is selected as the second frequency-domain bandwidth occupied by the control information by using the second method as described above, the first frequency-domain bandwidth occupied by the user data should be less than BW3 and greater than or equal to BW2, and thus it only needs to indicate the frequency-domain bandwidths between BW2 and BW3 that may be used for the user data. Assuming BW2=8 PRBs and BW3=16 PRBs, the first frequency-domain bandwidth occupied by the user data may be 8 PRBs, 9 PRBs, . . . , or 15 PRBs, that is, there are 8 possibilities for the first frequency-domain bandwidth occupied by the user data, which only requires 3 bits to represent the above indication information, and thus a relatively small number of bits are used for the above indication information.

In step 204, the receiver determines the n candidate frequency-domain bandwidths for the transmitter to send the control information.

Before performing blind detection on the control information, the receiver that established the sidelink communication with the above transmitter first determines the n candidate frequency-domain bandwidths for the transmitter to send the control information. The n candidate frequency-domain bandwidths may be notified to the receiver in advance by the transmitter, may be pre-defined by the protocol, or may be pre-configured by the access network device and notified to the two end devices of the sidelink communication.

In step 205, the receiver performs the blind detection on the control information according to the n candidate frequency-domain bandwidths.

The receiver determines several frequency-domain positions that may be occupied by the control information according to each of the candidate frequency-domain bandwidths, and blindly detects the control information at each of the frequency-domain positions that may be occupied. If the control information is detected at a certain frequency-domain position, the control information is decoded and received.

Still in the above example, it is assumed that the system bandwidth for the sidelink communication between the transmitter and the receiver is 48 PRBs, and that there are four candidate frequency-domain bandwidths, which are BW1=2 PRBs, BW2=4 PRBs, BW3=8 PRBs and BW4=16 PRBs, respectively. When the candidate frequency-domain bandwidth is BW1, every 2 adjacent PRBs form a group, the entire system bandwidth is divided into 24 groups of PRBs, and the frequency-domain position that may be occupied by the control information is any one of the above 24 groups of PRBs. By analogy, the receiver determines the frequency-domain positions that may be occupied by the control information according to each of the candidate frequency-domain bandwidths, and then blindly detects the control information at each of the frequency-domain positions that may be occupied.

In the embodiments of the present disclosure, since the second frequency-domain bandwidth occupied by the control information is selected from a preset limited number of candidate frequency-domain bandwidths, the frequency-domain positions that may be occupied by the control information are also relatively limited, thereby reducing the complexity of the blind detection on the control information by the receiver.

Optionally, the receiver may perform the following steps after the above step 205. The receiver determines, according to the detected control information, the first frequency-domain bandwidth occupied by the user data corresponding to the control information in the transmission of the user data, and then receives the user data in the first frequency-domain bandwidth. As explained above, the control information can carry the positions of the time-frequency resource blocks occupied by the user data, and thus the receiver can receive the user data on the corresponding time-frequency resource blocks according to the positions carried in the control information.

In summary, in the technical solutions provided in the embodiments of the present disclosure, the transmitter selects one candidate frequency-domain bandwidth from among a plurality of candidate frequency-domain bandwidths according to the first frequency-domain bandwidth occupied by the user data, as the second frequency-domain bandwidth occupied by the control information, and then sends the control information to the receiver in accordance with the second frequency-domain bandwidth. Since the second frequency-domain bandwidth occupied by the control information is selected from a pre-set limited number of candidate frequency-domain bandwidths, the frequency-domain positions that may be occupied by the control information are also relatively limited, thereby reducing the complexity of the blind detection on the control information by the receiver.

In addition, by selecting a candidate frequency-domain bandwidth that is as close as possible to the first frequency-domain bandwidth occupied by the user data, as the second frequency-domain bandwidth occupied by the control information, it is possible to ensure that the transmission powers for the control information and the user data are the same or close as much as possible, and the power densities for the control information and the user data in the unit bandwidth are the same or close, which can reduce the processing requirements for the transmitter on the one hand, and can ensure a success rate of receiving the control information and the user data by the receiver on the other hand.

It should be noted that, in the foregoing method embodiments, the technical solutions of the present disclosure are introduced and explained only from the perspective of the interaction between the transmitter and the receiver. The steps performed by the transmitter described above can be implemented separately as a method for sending control information in the sidelink communication scenario on the transmitter side, and the steps performed by the receiver described above can be implemented separately as a method for receiving control information in the sidelink communication scenario on the receiver side.

The following are device embodiments of the present disclosure, which can be used to implement the method embodiments of the present disclosure. For details that are not disclosed in the device embodiments of the present disclosure, reference can be made to the method embodiments of the present disclosure.

Figure 6:
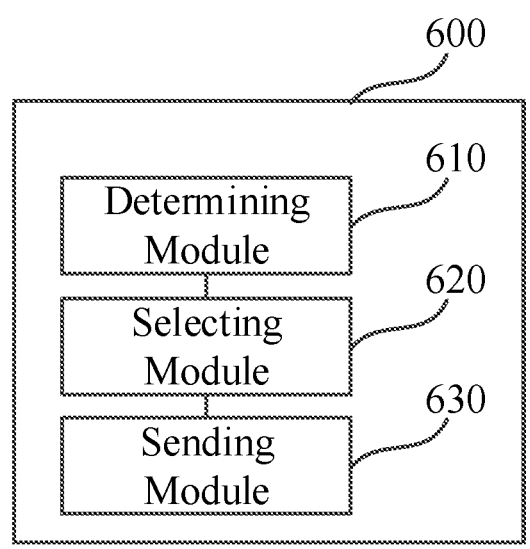
FIG. 6 is a block diagram showing a device for sending control information in a sidelink communication scenario according to an exemplary embodiment.

FIG. 6 is a block diagram showing a device for sending control information in a sidelink communication scenario according to an exemplary embodiment. The device has the function of implementing the exemplary method on the transmitter side described above, and the function can be realized by hardware, or by hardware executing corresponding software. The device 600 can include a determining module 610, a selecting module 620, and a sending module 630.

The determining module 610 is configured to determine a first frequency-domain bandwidth occupied by user data to be sent.

The selecting module 620 is configured to select, according to the first frequency-domain bandwidth, a second frequency-domain bandwidth occupied by control information corresponding to the user data from a number of n candidate frequency-domain bandwidths, where n is an integer greater than 1.

The sending module 630 is configured to send the control information to a receiver according to the second frequency-domain bandwidth.

In summary, in the technical solutions provided in the embodiments of the present disclosure, the transmitter selects one candidate frequency-domain bandwidth from among a plurality of candidate frequency-domain bandwidths according to the first frequency-domain bandwidth occupied by the user data, as the second frequency-domain bandwidth occupied by the control information, and then sends the control information to the receiver in accordance with the second frequency-domain bandwidth. Since the second frequency-domain bandwidth occupied by the control information is selected from a pre-set limited number of candidate frequency-domain bandwidths, the frequency-domain positions that may be occupied by the control information are also relatively limited, thereby reducing the complexity of the blind detection on the control information by the receiver.

In another optional example provided based on the embodiment in FIG. 6, the second frequency-domain bandwidth is a candidate frequency-domain bandwidth closest to the first frequency-domain bandwidth among the n candidate frequency-domain bandwidths.

In another optional example provided based on the embodiment in FIG. 6, the second frequency-domain bandwidth is a candidate frequency-domain bandwidth that is not greater than the first frequency-domain bandwidth among the n candidate frequency-domain bandwidths.

Optionally, the second frequency-domain bandwidth is a candidate frequency-domain bandwidth closest to the first frequency-domain bandwidth among the candidate frequency-domain bandwidths that are not greater than the first frequency-domain bandwidth.

In another optional example provided based on the embodiment in FIG. 6, the sending module 630 is configured to:

determine, according to a first frequency-domain position occupied by the user data and the second frequency-domain bandwidth, a second frequency-domain position occupied by the control information, where the second frequency-domain position overlaps with the first frequency-domain position; and send the control information to the receiver by occupying frequency-domain resources at the second frequency-domain position.

In another optional example provided based on the embodiment in FIG. 6, the control information includes indication information configured to indicate the first frequency-domain bandwidth occupied by the user data.

Figure 7:
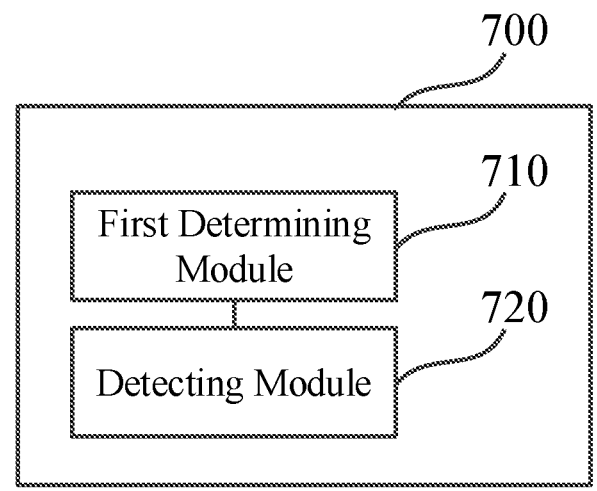
FIG. 7 is a block diagram showing a device for receiving control information in a sidelink communication scenario according to an exemplary embodiment.

FIG. 7 is a block diagram showing a device for receiving control information in a sidelink communication scenario according to an exemplary embodiment. The device has the function of implementing the exemplary method on the receiver side described above, and the function can be realized by hardware, or by hardware executing corresponding software. The device 700 can include a first determining module 710 and a detecting module 720.

The first determining module 710 is configured to determine a number of n candidate frequency-domain bandwidths for a transmitter to send control information, where a second frequency-domain bandwidth occupied by the control information in sending of the control information is one of the n candidate frequency-domain bandwidths, and n is an integer greater than 1.

The detecting module 720 is configured to perform blind detection on the control information according to the n candidate frequency-domain bandwidths.

In summary, in the technical solutions provided in the embodiments of the present disclosure, the transmitter selects one candidate frequency-domain bandwidth from among a plurality of candidate frequency-domain bandwidths according to the first frequency-domain bandwidth occupied by the user data, as the second frequency-domain bandwidth occupied by the control information, and then sends the control information to the receiver in accordance with the second frequency-domain bandwidth. Since the second frequency-domain bandwidth occupied by the control information is selected from a pre-set limited number of candidate frequency-domain bandwidths, the frequency-domain positions that may be occupied by the control information are also relatively limited, thereby reducing the complexity of the blind detection on the control information by the receiver.

In another optional example provided based on the embodiment in FIG. 7, the device 700 further includes a second determining module and a receiving module (not shown in the figure).

The second determining module is configured to determine, according to the detected control information, a first frequency-domain bandwidth occupied by user data corresponding to the control information in sending of the user data, where the control information includes indication information configured to indicate the first frequency-domain bandwidth occupied by the user data.

The receiving module is configured to receive the user data in the first frequency-domain bandwidth.

It should be noted that when the devices provided in the above embodiments realize the functions thereof, the division of the above-mentioned functional modules is used only as an example for illustration, and in actual applications, the above-mentioned functions can be allocated to be performed by different functional modules according to actual needs. That is, the content structure of the device is divided into different functional modules to complete all or part of the functions described above.

Regarding the devices according to the above embodiments, the specific manner in which each of the modules performs operation has been described in detail in the embodiments of the related methods, which will not be repeated here.

An exemplary embodiment of the present disclosure also provides a device for sending control information in a sidelink communication scenario, which can implement the method for sending control information in the sidelink communication scenario provided in the present disclosure. The device can be the transmitter described above, or can be set in the transmitter. The device includes a processor and a memory for storing instructions executable by the processor. The processor is configured to:

determine a first frequency-domain bandwidth occupied by user data to be sent;

select, according to the first frequency-domain bandwidth, from a number of n candidate frequency-domain bandwidths, a second frequency-domain bandwidth occupied by control information corresponding to the user data, where n is an integer greater than 1; and send the control information to the receiver according to the second frequency-domain bandwidth.

Optionally, the second frequency-domain bandwidth is a candidate frequency-domain bandwidth closest to the first frequency-domain bandwidth among the n candidate frequency-domain bandwidths.

Optionally, the second frequency-domain bandwidth is a candidate frequency-domain bandwidth that is not greater than the first frequency-domain bandwidth among the n candidate frequency-domain bandwidths.

Optionally, the second frequency-domain bandwidth is a candidate frequency-domain bandwidth closest to the first frequency-domain bandwidth among the candidate frequency-domain bandwidths that are not greater than the first frequency-domain bandwidth.

Optionally, the processor is further configured to:

determine, according to a first frequency-domain position occupied by the user data and the second frequency-domain bandwidth, a second frequency-domain position occupied by the control information, where the second frequency-domain position overlaps with the first frequency-domain position; and send the control information to the receiver by occupying frequency-domain resources at the second frequency-domain position.

Optionally, the control information includes indication information configured to indicate the first frequency-domain bandwidth occupied by the user data.

An exemplary embodiment of the present disclosure also provides a device for receiving control information in a sidelink communication scenario, which can implement the method for receiving control information in the sidelink communication scenario provided in the present disclosure. The device can be the receiver described above, or can be set in the receiver. The device includes a processor and a memory for storing instructions executable by the processor. The processor is configured to:

determine a number of n candidate frequency-domain bandwidths for a transmitter to send control information, where a second frequency-domain bandwidth occupied by the control information in sending of the control information is one of the n candidate frequency-domain bandwidths, and n is an integer greater than 1; and perform blind detection on the control information according to the n candidate frequency-domain bandwidths.

Optionally, the processor is further configured to:

determine, according to the detected control information, a first frequency-domain bandwidth occupied by user data corresponding to the control information in sending of the user data, where the control information includes indication information configured to indicate the first frequency-domain bandwidth occupied by the user data; and receive the user data in the first frequency-domain bandwidth.

The foregoing introduces and explains the solutions provided by the embodiments of the present disclosure mainly from the perspective of the interaction between the transmitter and the receiver. It can be understood that, in order to implement the above-mentioned functions, the device (including the transmitter and the receiver) includes a hardware structure and/or software module corresponding to each function. In combination with the units and algorithm steps of the examples described in the embodiments in the present disclosure, the embodiments of the present disclosure can be implemented in the form of hardware or a combination of hardware and computer software. Whether a certain function is performed by hardware or computer software-driven hardware depends on the specific applications of the technical solution and design constraint conditions. Those skilled in the art can use different methods for each specific application to implement the described functions, and such implementation should not be considered as going beyond the scope of the technical solutions of the embodiments of the present disclosure.

Figure 8:
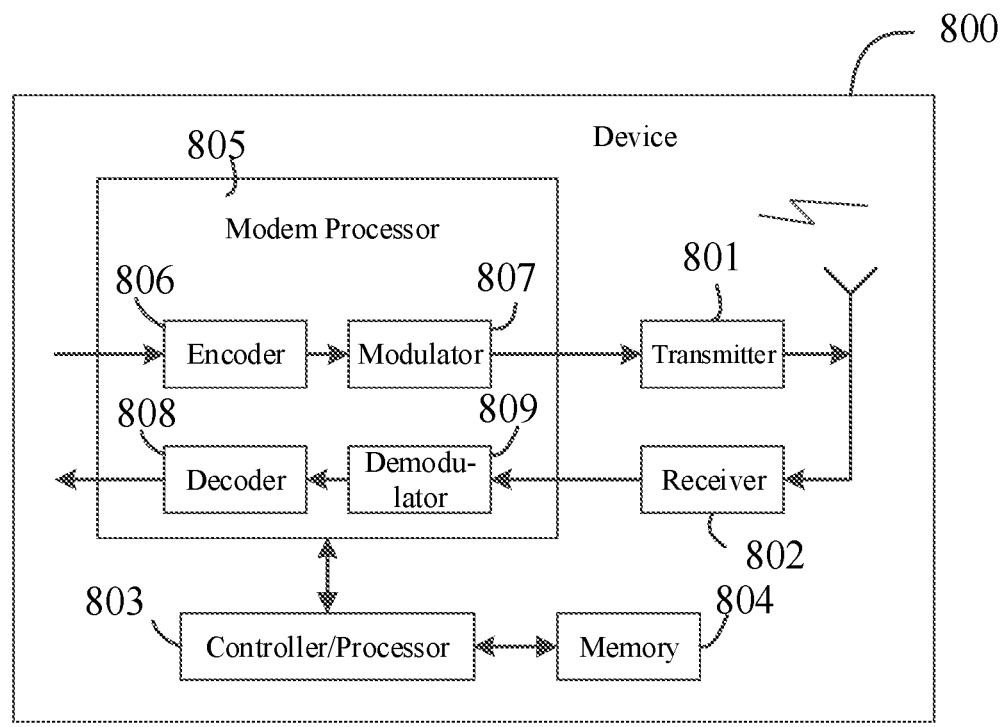
FIG. 8 is a schematic diagram showing a structure of a device in a sidelink communication scenario according to an exemplary embodiment.

FIG. 8 is a schematic structural diagram of a device 800 in a sidelink communication scenario according to an exemplary embodiment. The device 800 may be a device that performs sidelink communication with other devices in a V2X service scenario, for example, an electronic device such as an in-vehicle device and a terminal. The device 800 may be the transmitter or the receiver described above.

The device 800 includes a transmitter 801, a receiver 802 and a processor 803. The processor 803 may also be a controller, which is represented as "controller/processor 803" in FIG. 8. Optionally, the device 800 may further include a modem processor 805, and the modem processor 805 may include an encoder 806, a modulator 807, a decoder 808, and a demodulator 809.

In an example, the transmitter 801 performs adjustment (for example, analog conversion, filtering, amplification, up-conversion, etc.) on output samples and generates an uplink signal, which is transmitted to the access network device via an antenna. On the downlink, the antenna receives a downlink signal transmitted by the access network device. The receiver 802 performs adjustment (e.g., filtering, amplification, down-conversion, digitization, etc.) on the signal received from the antenna and provides input samples. In the modem processor 805, the encoder 806 receives service data and signaling messages to be transmitted on the uplink, and processes (for example, formats, encodes, and interleaves) the service data and signaling messages. The modulator 807 further processes (for example, symbol-maps and modulates) the encoded service data and signaling messages and provides output samples. The demodulator 809 processes (e.g., demodulates) the input samples and provides symbol estimates. The decoder 808 processes (e.g., de-interleaves and decodes) the symbol estimates and provides decoded data and signaling messages of the data and signaling messages sent to the device 800. The encoder 806, the modulator 807, the demodulator 809, and the decoder 808 can be implemented by a synthesized modem processor 805. These units perform process according to the radio access technologies adopted by the radio access network (for example, the access technologies for LTE and other evolved systems). It should be noted that when the device 800 does not include the modem processor 805, the foregoing functions of the modem processor 805 may also be implemented by the processor 803.

The processor 803 controls and manages actions of the device 800, and is configured to perform the processing procedure performed by the device 800 in the foregoing embodiments of the present disclosure. For example, the processor 803 is further configured to perform each step for the transmitter or the receiver in the foregoing method embodiments, and/or other steps of the technical solutions described in the embodiments of the present disclosure.

Further, the device 800 may further include a memory 804, and the memory 804 is configured to store program codes and data for the device 800.

It can be understood that FIG. 8 only shows a simplified design of the device 800. In practical applications, the device 800 may include any number of transmitters, receivers, processors, modem processors, memories, etc., and all devices that can implement the embodiments of the present disclosure fall within the protection scope of the embodiments of the present disclosure.

An embodiment of the present disclosure also provides a non-transitory computer-readable storage medium having stored thereon a computer program which, when being executed by the processor of the device 800, implements the method for sending the control information in the sidelink communication scenario described above, or implements the method for receiving the control information in the sidelink communication scenario described above.

It should be understood that "a plurality" mentioned herein means two or more. "And/or" describes an association relationship of related objects, indicating that there can be three types of relationships. For example, A and/or B may refers to three cases where A exists alone, A and B exist at the same time, and B exists alone. The character "/" generally indicates that the related objects before and after this character are in an "or" relationship.

After considering the description and practicing the disclosure herein, those skilled in the art will readily contemplate other embodiments of the disclosure. The disclosure is intended to cover any variations, uses, or adaptions of the disclosure that conform to the general principles of the disclosure and include common general knowledge or conventional technical means in the technical field which are not disclosed in the disclosure. It is intended that the description and embodiments shall be considered as exemplary only, and the true scope and spirit of the disclosure are indicated by the appended claims.

It should be understood that the disclosure is not limited to the precise structures that have been described above and shown in the accompanying drawings, and various modifications and changes can be made without departing from the scope thereof. The scope of the disclosure is defined only by the appended claims.

What is claimed is:

1. A method for sending control information in a sidelink communication, comprising:

determining, by a transmitter, a first frequency-domain bandwidth occupied by user data to be sent;

selecting, by the transmitter based on the first frequency-domain bandwidth, from a number of n candidate frequency-domain bandwidths, a second frequency-domain bandwidth occupied by control information corresponding to the user data, wherein n is an integer greater than 1; and sending, by the transmitter based on the second frequency-domain bandwidth, the control information to a receiver.

2. The method according to claim 1, wherein the second frequency-domain bandwidth is a candidate frequency-domain bandwidth closest to the first frequency-domain bandwidth among the n candidate frequency-domain bandwidths.

3. The method according to claim 1, wherein the second frequency-domain bandwidth is a candidate frequency-domain bandwidth that is not greater than the first frequency-domain bandwidth among the n candidate frequency-domain bandwidths.

4. The method according to claim 3, wherein the second frequency-domain bandwidth is a candidate frequency-domain bandwidth closest to the first frequency-domain bandwidth among the candidate frequency-domain bandwidths that are not greater than the first frequency-domain bandwidth.

5. The method according to claim 1, wherein the sending, by the transmitter based on the second frequency-domain bandwidth, the control information to the receiver comprises:
   determining, by the transmitter based on a first frequency-domain position occupied by the user data and the second frequency-domain bandwidth, a second frequency-domain position occupied by the control information, wherein the second frequency-domain position overlaps with the first frequency-domain position; and
   sending, by the transmitter by occupying frequency-domain resources at the second frequency-domain position, the control information to the receiver.

6. The method according to claim 1, wherein the control information comprises indication information configured to indicate the first frequency-domain bandwidth occupied by the user data.

7. A method for receiving control information in sidelink communication, comprising:
   determining, by a receiver, a number of n candidate frequency-domain bandwidths for a transmitter to send control information, wherein a second frequency-domain bandwidth occupied by the control information in sending of the control information is one of the n candidate frequency-domain bandwidths, and n is an integer greater than 1; and
   performing, by the receiver based on the n candidate frequency-domain bandwidths, blind detection on the control information.

8. The method according to claim 7, further comprising:
   determining, by the receiver based on the detected control information, a first frequency-domain bandwidth occupied by user data corresponding to the control information in sending of the user data,
      wherein the control information comprises indication information configured to indicate the first frequency-domain bandwidth occupied by the user data; and
   receiving, by the receiver, the user data in the first frequency-domain bandwidth.

9. A device for sending control information in sidelink communication, which is applied to a transmitter and comprises:
   a processor; and
   a memory for storing instructions executable by the processor,
   wherein the processor is configured to:
      determine a first frequency-domain bandwidth occupied by user data to be sent;
      select, based on the first frequency-domain bandwidth, from a number of n candidate frequency-domain bandwidths, a second frequency-domain bandwidth occupied by control information corresponding to the user data, wherein n is an integer greater than 1; and
      send the control information to a receiver based on the second frequency-domain bandwidth.

10. A device implementing the method according claim 7, comprising:
   a processor; and
   a memory for storing instructions executable by the processor,
   wherein the processor is configured to implement steps of the method.

11. A communication system implementing the method according to claim 1, comprising the transmitter, wherein the second frequency-domain bandwidth occupied by the control information is selected from the number of n candidate frequency-domain band widths with n being a pre-set limited number, to limit frequency-domain positions that are capable of being occupied by the control information, thereby reducing complexity of blind detection on the control information by the receiver.

12. The communication system according to claim 11, further comprising the receiver, wherein the receiver is configured to:
   determine the number of n candidate frequency-domain bandwidths for the transmitter to send control information,
      wherein the second frequency-domain bandwidth occupied by the control information in sending of the control information is one of the n candidate frequency-domain bandwidths; and
   perform the blind detection on the control information based on the n candidate frequency-domain bandwidths.

13. The communication system according to claim 12, wherein the receiver is further configured to:
   determine, based on the detected control information, the first frequency-domain bandwidth occupied by the user data corresponding to the control information in sending of the user data,
      wherein the control information comprises indication information configured to indicate the first frequency-domain bandwidth occupied by the user data; and
   receive the user data in the first frequency-domain bandwidth.

14. A non-transitory computer readable medium having instructions stored thereon for execution by a processing circuit to implement the method according to claim 1.

15. A non-transitory computer readable medium having instructions stored thereon for execution by a processing circuit to implement the method according to claim 7.

* * * * *